(12) United States Patent
Greytak et al.

(10) Patent No.: US 10,174,243 B2
(45) Date of Patent: Jan. 8, 2019

(54) HIGHLY LUMINESCENT SEMICONDUCTOR NANOCRYSTALS

(75) Inventors: Andrew B. Greytak, Columbia, SC (US); Wenhao Liu, Somerville, MA (US); Peter M. Allen, Cambridge, MA (US); Moungi G. Bawendi, Cambridge, MA (US); Daniel G. Nocera, Winchester, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 293 days.

(21) Appl. No.: 12/862,195

(22) Filed: Aug. 24, 2010

(65) Prior Publication Data

US 2012/0049119 A1  Mar. 1, 2012

(51) Int. Cl.
*C09K 11/88* (2006.01)
*C09K 11/58* (2006.01)

(52) U.S. Cl.
CPC .......... *C09K 11/584* (2013.01); *C09K 11/883* (2013.01)

(58) Field of Classification Search
None
See application file for complete search history.

(56) References Cited

U.S. PATENT DOCUMENTS

| 7,767,260 B2 * | 8/2010 | Peng et al. ............. 427/214 |
| 2006/0078490 A1 * | 4/2006 | Shih ............. B82Y 5/00 423/566.1 |
| 2010/0044636 A1 | 2/2010 | Ramprasad | |

FOREIGN PATENT DOCUMENTS

WO  WO2008/063653  *  5/2008

OTHER PUBLICATIONS

Li. Large-Scale Synthesis of Nearly Monodisperse CdSe/CdS Core/Shell Nanocrystals Using Air-Stable reagents via Successive Ion layer Adsorption and Reaction. J. Am. Chem. Soc. 2003, 125, 12567-12575.*
Xie. Synthesis and Characterization of Highly Luminescent CdSe-Core CdS/Zn0.5Cd0.5S/ZnS Multishell Nanocrystals. J. Am. Chem. Soc. 2005, 127, 7480-7488.*
McBride, J., et al, "Structural Basis for Near Unity Quantum Yield Core/Shell Nanostructures," Nano Letters, vol. 6, No. 7, Jun. 9, 2006, pp. 1496-1501.
Peng, X., et al., "Epitaxial growth of highly luminescent CdSe/CdS core/shell nanocrystals with photostability and electronic accessibility," Journal of the American Chemical Society, American Chemical Society, vol. 119, Jan. 1, 1997, pp. 7019-7029.
Jian, W., et al., "Preparation of Highly Luminescent CdTe/CdS Core/Shell Quantum Dots," Chemphyschem, vol. 10, No. 4, Mar. 9, 2009, pp. 680-685.
International Search Report and Written Opinion of the International Searching Authority dated Dec. 13, 2011 for PCT/US2011/048299.
International Preliminary Report on Patentability dated Mar. 7, 2013 for PCT/US2011/048299.

* cited by examiner

*Primary Examiner* — Matthew E. Hoban
(74) *Attorney, Agent, or Firm* — Steptoe & Johnson LLP

(57) ABSTRACT

A semiconductor nanocrystal can have a photoluminescent quantum yield of at least 90%, at least 95%, or at least 98%. The nanocrystal can be made by sequentially contacting a nanocrystal core with an M-containing compound and an X donor, where at least one of the M-containing compound and the X donor is substoichiometric with respect to forming a monolayer on the nanocrystal core.

13 Claims, 3 Drawing Sheets

HIGHLY LUMINESCENT SEMICONDUCTOR NANOCRYSTALS

FEDERALLY SPONSORED RESEARCH

This invention was made with government support under Grant No. R01 CA126642, awarded by the National Institute of Health and under Grant No. W911NF-06-1-0101, awarded by the Army Research Office. The government has certain rights in this invention.

FIELD OF THE INVENTION

This invention relates to highly luminescent semiconductor nanocrystals.

BACKGROUND

Semiconductor nanocrystals are a powerful class of nanostructures that exhibit high photoluminescence quantum yields, large molar extinction coefficients, high photostability compared to typical molecular fluorophores, and size-tunable emission wavelengths that can extend across the visible and near-IR spectral range. These properties make semiconductor nanocrystals useful in applications including biological fluorescent tags and light-emitting devices, among others.

SUMMARY

Semiconductor nanocrystals have size-dependent optical and electronic properties. In particular, the band gap energy of a semiconductor nanocrystal of a particular semiconductor material varies with the diameter of the crystal. Generally, a semiconductor nanocrystal is a member of a population of nanocrystals having a distribution of sizes. When the distribution is centered about a single value and narrow, the population can be described as monodisperse. Monodisperse particles can be defined as having at least 60% of the particles fall within a specified particle size range. Monodisperse particles can deviate less in their diameters less than 10% rms and preferably less than 5% rms.

Many applications of semiconductor nanocrystals depend on their photoluminescent properties. Accordingly, semiconductor nanocrystals having narrow emission linewidths (expressed, for example, as a full width at half max) and high quantum yields are desirable.

In one aspect, a semiconductor nanocrystal can have a photoluminescent quantum yield of at least 90%. The semiconductor nanocrystal can include a core including a first semiconductor material and a shell including a second semiconductor material.

The first semiconductor material can be ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, PbTe, or a mixture thereof. Independently, the second semiconductor material can be ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, PbTe, or a mixture thereof.

The semiconductor nanocrystal can be a member of a population of semiconductor nanocrystals, wherein the population exhibits photoluminescence with a full width at half max of less than 30 nm. In some embodiments, the first semiconductor material can be CdSe; independently, the second semiconductor material can be CdS.

In another aspect, a method of making a semiconductor nanocrystal includes forming a nanocrystal core including a first semiconductor material, and sequentially contacting the nanocrystal core with an M-containing compound and an X donor, thereby forming a second semiconductor material on a surface of the nanocrystal core, where at least one of the M-containing compound and the X donor is substoichiometric with respect to forming a monolayer on the nanocrystal core.

The method can include repeating the step of sequentially contacting the nanocrystal core with an M-containing compound and an X donor. Both the M-containing compound and the X donor can be substoichiometric with respect to forming a monolayer on the nanocrystal core. The M-containing compound can be selected to react quantitatively. The X donor can be selected to react quantitatively.

In the method, the first semiconductor material can be ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, PbTe, or a mixture thereof. Independently, the second semiconductor material can be ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, PbTe, or a mixture thereof.

In some embodiments, the first semiconductor material can be CdSe; independently, the second semiconductor material can be CdS. The X donor can be bis(trimethylsilyl) sulfide.

In another aspect, a population of semiconductor nanocrystals can exhibit photoluminescence with a quantum yield of at least 90% and a full width at half max (FWHM) of less than 30 nm. The population can exhibits photoluminescence with a quantum yield of at least 95%, or at least 98%.

Other embodiments are within the scope of the claims.

DETAILED DESCRIPTION

Figure 1:
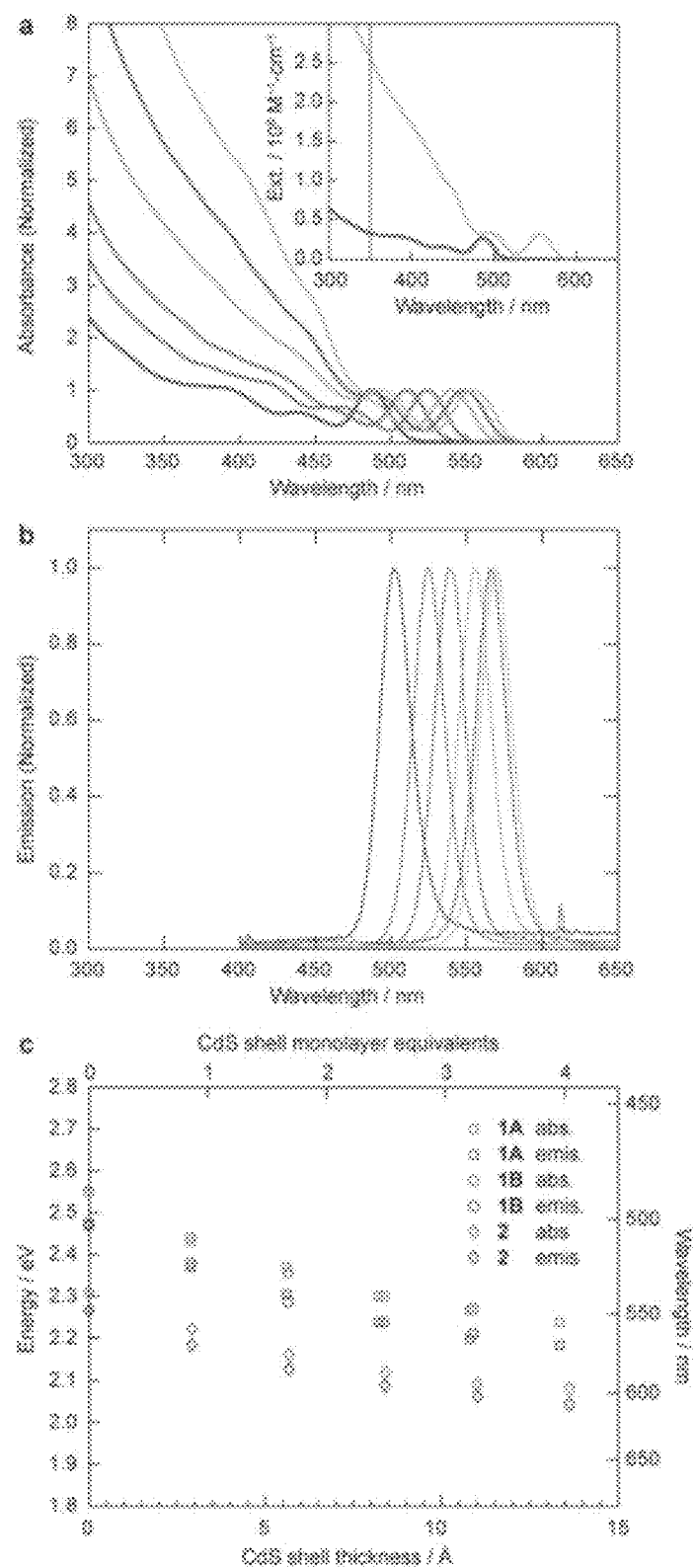
FIGS. 1A-1C are graphs depicting optical properties of semiconductor nanocrystals with varying degrees of overcoating.

Semiconductor nanocrystals demonstrate quantum confinement effects in their luminescent properties. When semiconductor nanocrystals are illuminated with a primary energy source, a secondary emission of energy occurs at a frequency that relates to the band gap of the semiconductor material used in the nanocrystal. In quantum confined particles, the frequency is also related to the size of the nanocrystal.

Core-shell heterostructures have been widely explored as a means to adjust the photophysical properties of semiconductor nanocrystals, and can be used to increase their brightness as fluorophores in two ways: (1) maximizing the photoluminescence (PL) quantum yield (QY) through electronic and chemical isolation of the core from surface-associated recombination centers; and (2) increasing the excitation rate (absorption cross-section) by building a high density of electronic states at energies above the shell bandgap. These two roles for the shell present a potential trade-off in terms of shell material. A wide bandgap shell imposes large electronic barriers for carrier access to the surface but will be less able to contribute to absorption, while a narrower gap shell could participate in light harvesting but may make it harder to achieve high QY.

For the case of CdSe, one of the best studied nanocrystal core materials, CdS and ZnS are isostructural materials that have been applied to form shells, both as pure materials and in heterostructures with alloyed and/or graded compositions of $Cd_xZn_{1-x}S$. The use of Cd-rich or pure CdS shells imposes challenges in maintaining high QY, and in terms of the strong redshift of the nanocrystal excited states encountered upon overcoating with a weakly-confining shell. The redshift imposes a strong requirement of structural homogeneity in shell growth if inhomogeneous broadening of the PL emission spectrum is to be avoided.

In general, the method of manufacturing a nanocrystal is a colloidal growth process. See, for example, U.S. Pat. Nos. 6,322,901 and 6,576,291, each of which is incorporated by reference in its entirety. Colloidal growth can result when an M-containing compound and an X donor are rapidly injected into a hot coordinating solvent. The coordinating solvent can include an amine. The M-containing compound can be a metal, an M-containing salt, or an M-containing organometallic compound. The injection produces a nucleus that can be grown in a controlled manner to form a nanocrystal. The reaction mixture can be gently heated to grow and anneal the nanocrystal. Both the average size and the size distribution of the nanocrystals in a sample are dependent on the growth temperature. The growth temperature necessary to maintain steady growth increases with increasing average crystal size. The nanocrystal is a member of a population of nanocrystals. As a result of the discrete nucleation and controlled growth, the population of nanocrystals obtained has a narrow, monodisperse distribution of diameters. The monodisperse distribution of diameters can also be referred to as a size. The process of controlled growth and annealing of the nanocrystals in the coordinating solvent that follows nucleation can also result in uniform surface derivatization and regular core structures. As the size distribution sharpens, the temperature can be raised to maintain steady growth. By adding more M-containing compound or X donor, the growth period can be shortened.

The M-containing salt can be a non-organometallic compound, e.g., a compound free of metal-carbon bonds. M can be cadmium, zinc, magnesium, mercury, aluminum, gallium, indium, thallium, or lead. The M-containing salt can be a metal halide, metal carboxylate, metal carbonate, metal hydroxide, metal oxide, or metal diketonate, such as a metal acetylacetonate. The M-containing salt is less expensive and safer to use than organometallic compounds, such as metal alkyls. For example, the M-containing salts are stable in air, whereas metal alkyls are generally unstable in air. M-containing salts such as 2,4-pentanedionate (i.e., acetylacetonate (acac)), halide, carboxylate, hydroxide, oxide, or carbonate salts are stable in air and allow nanocrystals to be manufactured under less rigorous conditions than corresponding metal alkyls.

Suitable M-containing salts include cadmium acetylacetonate, cadmium iodide, cadmium bromide, cadmium chloride, cadmium hydroxide, cadmium carbonate, cadmium acetate, cadmium oxide, zinc acetylacetonate, zinc iodide, zinc bromide, zinc chloride, zinc hydroxide, zinc carbonate, zinc acetate, zinc oxide, magnesium acetylacetonate, magnesium iodide, magnesium bromide, magnesium chloride, magnesium hydroxide, magnesium carbonate, magnesium acetate, magnesium oxide, mercury acetylacetonate, mercury iodide, mercury bromide, mercury chloride, mercury hydroxide, mercury carbonate, mercury acetate, aluminum acetylacetonate, aluminum iodide, aluminum bromide, aluminum chloride, aluminum hydroxide, aluminum carbonate, aluminum acetate, gallium acetylacetonate, gallium iodide, gallium bromide, gallium chloride, gallium hydroxide, gallium carbonate, gallium acetate, indium acetylacetonate, indium iodide, indium bromide, indium chloride, indium hydroxide, indium carbonate, indium acetate, thallium acetylacetonate, thallium iodide, thallium bromide, thallium chloride, thallium hydroxide, thallium carbonate, or thallium acetate.

Alkyl is a branched or unbranched saturated hydrocarbon group of 1 to 100 carbon atoms, preferably 1 to 30 carbon atoms, such as methyl, ethyl, n-propyl, isopropyl, n-butyl, isobutyl, t-butyl, octyl, decyl, tetradecyl, hexadecyl, eicosyl, tetracosyl and the like, as well as cycloalkyl groups such as cyclopentyl, cyclohexyl and the like. Optionally, an alkyl can contain 1 to 6 linkages selected from the group consisting of —O—, —S—, —M— and —NR— where R is hydrogen, or $C_1$-$C_8$ alkyl or lower alkenyl.

Prior to combining the M-containing salt with the X donor, the M-containing salt can be contacted with a coordinating solvent to form an M-containing precursor. Typical coordinating solvents include alkyl phosphines, alkyl phosphine oxides, alkyl phosphonic acids, or alkyl phosphinic acids; however, other coordinating solvents, such as pyridines, furans, and amines may also be suitable for the nanocrystal production. Examples of suitable coordinating solvents include pyridine, tri-n-octyl phosphine (TOP) and tri-n-octyl phosphine oxide (TOPO). Technical grade TOPO can be used. The coordinating solvent can include a 1,2-diol or an aldehyde. The 1,2-diol or aldehyde can facilitate reaction between the M-containing salt and the X donor and improve the growth process and the quality of the nanocrystal obtained in the process. The 1,2-diol or aldehyde can be a $C_6$-$C_{20}$ 1,2-diol or a $C_6$-$C_{20}$ aldehyde. A suitable 1,2-diol is 1,2-hexadecanediol or myristol and a suitable aldehyde is dodecanal is myristic aldehyde.

The X donor is a compound capable of reacting with the M-containing salt to form a material with the general formula MX. Typically, the X donor is a chalcogenide donor or a pnictide donor, such as a phosphine chalcogenide, a bis(silyl) chalcogenide, dioxygen, an ammonium salt, or a tris(silyl) pnictide. Suitable X donors include dioxygen, elemental sulfur, bis(trimethylsilyl) selenide (($TMS)_2Se$), trialkyl phosphine selenides such as (tri-n-octylphosphine) selenide (TOPSe) or (tri-n-butylphosphine) selenide (TBPSe), trialkyl phosphine tellurides such as (tri-n-octylphosphine) telluride (TOPTe) or hexapropylphosphorustriamide telluride (HPPTTe), bis(trimethylsilyl)telluride (($TMS)_2Te$), sulfur, bis(trimethylsilyl)sulfide (($TMS)_2S$), a trialkyl phosphine sulfide such as (tri-n-octylphosphine) sulfide (TOPS), tris(dimethylamino) arsine, an ammonium salt such as an ammonium halide (e.g., $NH_4Cl$), tris(trimethylsilyl) phosphide (($TMS)_3P$), tris(trimethylsilyl) arsenide (($TMS)_3As$), or tris(trimethylsilyl) antimonide (($TMS)_3Sb$). In certain embodiments, the M donor and the X donor can be moieties within the same molecule.

The nanocrystal manufactured from an M-containing salt grows in a controlled manner when the coordinating solvent includes an amine. The amine in the coordinating solvent can contribute to the quality of the nanocrystal obtained from the M-containing salt and X donor. Preferably, the coordinating solvent is a mixture of the amine and an alkyl phosphine oxide. The combined solvent can decrease size dispersion and can improve photoluminescence quantum yield of the nanocrystal. The preferred amine is a primary alkyl amine or a primary alkenyl amine, such as a $C_2$-$C_{20}$ alkyl amine, a $C_2$-$C_{20}$ alkenyl amine, preferably a $C_8$-$C_{18}$ alkyl amine or a $C_8$-$C_{18}$ alkenyl amine. For example, suitable amines for combining with tri-octylphosphine oxide (TOPO) include 1-hexadecylamine, or oleylamine. When the 1,2-diol or aldehyde and the amine are used in combination with the M-containing salt to form a population of nanocrystals, the photoluminescence quantum efficiency and the distribution of nanocrystal sizes are improved in comparison to nanocrystals manufactured without the 1,2-diol or aldehyde or the amine.

The nanocrystal can be a member of a population of nanocrystals having a narrow size distribution. The nanocrystal can be a sphere, rod, disk, or other shape. The nanocrystal can include a core of a semiconductor material. The nanocrystal can include a core having the formula MX, where M is cadmium, zinc, magnesium, mercury, aluminum, gallium, indium, thallium, or mixtures thereof, and X is oxygen, sulfur, selenium, tellurium, nitrogen, phosphorus, arsenic, antimony, or mixtures thereof.

The emission from the nanocrystal can be a narrow Gaussian emission band that can be tuned through the complete wavelength range of the ultraviolet, visible, or infrared regions of the spectrum by varying the size of the nanocrystal, the composition of the nanocrystal, or both. For example, both CdSe and CdS can be tuned in the visible region and InAs can be tuned in the infrared region.

A population of nanocrystals can have a narrow size distribution. The population can be monodisperse and can exhibit less than a 15% rms deviation in diameter of the nanocrystals, preferably less than 10%, more preferably less than 5%. Spectral emissions in a narrow range of between 10 and 100 nm full width at half max (FWHM) can be observed. Semiconductor nanocrystals can have emission quantum efficiencies (i.e., quantum yields, QY) of greater than 2%, 5%, 10%, 20%, 40%, 60%, 70%, 80%, or 90%. Semiconductor nanocrystals can have a QY of at least 90%, at least 91%, at least 92%, at least 93%, at least 94%, at least 95%, at least 96%, at least 97%, at least 97%, at least 98%, or at least 99%.

The semiconductor forming the core of the nanocrystal can include Group II-VI compounds, Group II-V compounds, Group III-VI compounds, Group III-V compounds, Group IV-VI compounds, Group I-III-VI compounds, Group II-IV-VI compounds, and Group II-IV-V compounds, for example, ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, PbTe, or mixtures thereof.

The quantum efficiency of emission from nanocrystals having a core of a first semiconductor material can be enhanced by applying an overcoating of a second semiconductor material such that the conduction band of the second semiconductor material is of higher energy than that of the first semiconductor material, and the valence band of the second semiconductor material is of lower energy than that of the first semiconductor material. As a result, charge carriers, i.e., electrons and holes, are confined in the core of the nanocrystal when in an excited state. Alternatively, the conduction band or valence band of overcoating material can have an energy intermediate between the energies of the conduction and valence bands of the core material. In this case, one carrier can be confined to the core while the other is confined to the overcoating material when in an excited state. See, for example, U.S. Pat. No. 7,390,568, which is incorporated by reference in its entirety. The core can have an overcoating on a surface of the core. The band gap of core and overcoating can have a desired band offset. In CdTe/CdSe (core/shell) nanocrystals, the conduction band of the shell is intermediate in energy to the valence band and conduction band of the core. CdTe/CdSe (core/shell) nanocrystals have lower potentials for the holes in the core and for the electrons in the shell. As a result, the holes can be mostly confined to the CdTe core, while the electrons can be mostly confined to the CdSe shell. CdSe/ZnTe (core/shell) nanocrystals have the valence band of the shell intermediate in energy to the valence band and conduction band of the core. As a result, the electrons reside mostly in the CdSe cores, while the holes reside mostly in the ZnTe shells. The overcoating can be a semiconductor material having a composition different from the composition of the core, and can have a band gap greater than the band gap of the core. The overcoat of a semiconductor material on a surface of the nanocrystal can include a Group II-VI compounds, Group II-V compounds, Group III-VI compounds, Group III-V compounds, Group IV-VI compounds, Group I-III-VI compounds, Group II-IV-VI compounds, and Group II-IV-V compounds, for example, ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, PbTe, or mixtures thereof.

Shells are formed on nanocrystals by introducing shell precursors at a temperature where material adds to the surface of existing nanocrystals but at which nucleation of new particles is rejected. In order to help suppress nucleation and anisotropic elaboration of the nanocrystals, selective ionic layer adhesion and reaction (SILAR) growth techniques can be applied. See, e.g., U.S. Pat. No. 7,767,260, which is incorporated by reference in its entirety. In the SILAR approach, metal and chalcogenide precursors are added separately, in an alternating fashion, in doses calculated to saturate the available binding sites on the nanocrystal surfaces, thus adding one-half monolayer with each dose. The goals of such an approach are to: (1) saturate available surface binding sites in each half-cycle in order to enforce isotropic shell growth; and (2) avoid the simultaneous presence of both precursors in solution so as to minimize the rate of homogenous nucleation of new nanoparticles of the shell material.

In the SILAR approach, it can be beneficial to select reagents that react cleanly and to completion at each step. In other words, the reagents selected should produce few or no reaction by-products, and substantially all of the reagent added should react to add shell material to the nanocrystals. Completion of the reaction can be favored by adding substoichiometric amounts of the reagent. In other words, when less than one equivalent of the reagent is added, the likelihood of any unreacted starting material remaining is decreased.

Furthermore, the quality of core-shell nanocrystals produced (e.g., in terms of size monodispersity and QY) can be enhanced by using a constant and lower shell growth temperature than has been typically been used in the past. Alternatively, high temperatures may also be used. The techniques described here are amenable to a wide temperature range, unlike earlier SILAR methods that worked only at very high temperatures. In addition, a low-temperature or room temperature "hold" step can be used during the synthesis or purification of core materials prior to shell growth.

The outer surface of the nanocrystal can include a layer of compounds derived from the coordinating agent used during the growth process. The surface can be modified by repeated exposure to an excess of a competing coordinating group to form an overlayer. For example, a dispersion of the capped nanocrystal can be treated with a coordinating organic compound, such as pyridine, to produce crystals which disperse readily in pyridine, methanol, and aromatics but no longer disperse in aliphatic solvents. Such a surface exchange process can be carried out with any compound capable of coordinating to or bonding with the outer surface of the nanocrystal, including, for example, phosphines, thiols, amines and phosphates. The nanocrystal can be exposed to short chain polymers which exhibit an affinity for the surface and which terminate in a moiety having an affinity for a suspension or dispersion medium. Such affinity improves the stability of the suspension and discourages flocculation of the nanocrystal.

Monodentate alkyl phosphines (and phosphine oxides; the term phosphine below will refer to both) can passivate nanocrystals efficiently. When nanocrystals with conventional monodentate ligands are diluted or embedded in a non-passivating environment (i.e., one where no excess ligands are present), they tend to lose their high luminescence. Typical are an abrupt decay of luminescence, aggregation, and/or phase separation. In order to overcome these limitations, polydentate ligands can be used, such as a family of polydentate oligomerized phosphine ligands. The polydentate ligands show a high affinity between ligand and nanocrystal surface. In other words, they are stronger ligands, as is expected from the chelate effect of their polydentate characteristics.

In general, a ligand for a nanocrystal can include a first monomer unit including a first moiety having affinity for a surface of the nanocrystal, a second monomer unit including a second moiety having a high water solubility, and a third monomer unit including a third moiety having a selectively reactive functional group or a selectively binding functional group. In this context, a "monomer unit" is a portion of a polymer derived from a single molecule of a monomer. For example, a monomer unit of poly(ethylene) is —$CH_2CH_2$—, and a monomer unit of poly(propylene) is —$CH_2CH$($CH_3$)—. A "monomer" refers to the compound itself, prior to polymerization, e.g., ethylene is a monomer of poly (ethylene) and propylene of poly(propylene).

A selectively reactive functional group is one that can form a covalent bond with a selected reagent under selected conditions. One example of a selectively reactive functional group is a primary amine, which can react with, for example, a succinimidyl ester in water to form an amide bond. A selectively binding functional group is a functional group that can form a noncovalent complex with a selective binding counterpart. Some well known examples of selectively binding functional groups and their counterparts include biotin and streptavidin; a nucleic acid and a sequence-complementary nucleic acid; FK506 and FKBP; or an antibody and its corresponding antigen.

A moiety having high water solubility typically includes one or more ionized, ionizable, or hydrogen bonding groups, such as, for example, an amine, an alcohol, a carboxylic acid, an amide, an alkyl ether, a thiol, or other groups known in the art. Moieties that do not have high water solubility include, for example, hydrocarbyl groups such as alkyl groups or aryl groups, haloalkyl groups, and the like. High water solubility can be achieved by using multiple instances of a slightly soluble group: for example, diethyl ether is not highly water soluble, but a poly(ethylene glycol) having multiple instances of a —$CH_2$—O—$CH_2$-alkyl ether group can be highly water soluble.

For example, the ligand can include a polymer including a random copolymer. The random copolymer can be made using any method of polymerization, including cationic, anion, radical, metathesis or condensation polymerization, for example, living cationic polymerization, living anionic polymerization, ring opening metathesis polymerization, group transfer polymerization, free radical living polymerization, living Ziegler-Natta polymerization, or reversible addition fragmentation chain transfer (RAFT) polymerization.

EXAMPLES

Cadmium selenide nanocrystal cores were synthesized using cadmium oxide and trioctylphosphine selenide precursors in the presence of tetradecylphosphonic acid (TDPA) in a solvent of trioctylphosphine (TOP) and trioctylphosphine oxide (TOPO). See, e.g., Murray, C.; et al. *Journal of the American Chemical Society* 1993, 115, 8706-8715, which is incorporated by reference in its entirety. Care was required in isolating core nanocrystals from byproducts of the core synthesis reaction in order to avoid nucleation of CdS particles in subsequent overcoating steps. CdSe cores were isolated by two cycles of flocculation from hexane with acetone, holding the nanocrystals in pure hexane solution at 4° C. overnight between cycles and decanting the nanocrystal solution from precipitates that appeared.

Growth of conformal CdS shells (overcoating) on the CdSe nanocrystal cores was accomplished at a constant temperature (typically 180° C.) in a solvent of oleylamine and 1-octadecene (ODE). The cadmium precursor was Cd oleate in a solvent of 50:50 ODE and TOP with two equivalents of decylamine (vs. Cd) added. The sulfur precursor was hexamethyldisilathiane ($TMS_2S$) in TOP (see, for example, Hines, M.; Guyot-Sionnest, P. *Journal of Physical Chemistry* 1996, 100, 468-471; Kuno, M.; et al. *Journal of Chemical Physics* 1997, 106, 9869-9882; and Snee, P.; et al. *Advanced Materials* 2005, 17, 1131; each of which is incorporated by reference in its entirety. This is in contrast to most nanocrystal SILAR literature, in which a preparation of elemental S in olefin solvents has been used. See, e.g., Li, J.; et al. *J. Am. Chem. Soc.* 2003, 125, 12567-12575; Xie, R.; et al. *J. Am. Chem. Soc.* 2005, 127, 7480-7488; Chen, Y.; et al. *J. Am. Chem. Soc.* 2008, 130, 5026-5027; van Embden, J.; et al. *Journal of the American Chemical Society* 2009; Mahler, B.; et al. *Nat Mater* 2008, 7, 659-664; and Jha, P. P.; Guyot-Sionnest, P. *ACS Nano* 2009, 3, 1011-1015; each of which is incorporated by reference in its entirety.

Cadmium and sulfur precursors were added alternately in doses calculated to provide slightly less than one monolayer (ML) of surface coverage. The marginal thickness of one ML is taken as ½ of the c-axis lattice constant for CdS with the wurtzite crystal structure, or 0.337 nm (Xie, R.; et al. *J. Am. Chem. Soc.* 2005, 127, 7480-7488; and Kuno, M.; et al. *Journal of Chemical Physics* 1997, 106, 9869-9882; each of which is incorporated by reference in its entirety). The volume of such a shell was divided by the CdS unit cell volume to determine the quantity of precursor that was required for each dose. The quantity (number of moles) of CdSe cores in a given preparation and the core radius were determined by estimating the molar extinction coefficient of the core batch on the basis of the wavelength of the lowest-energy absorption feature (see, for example, Leatherdale, C.; et al. *Journal of Physical Chemistry B* 2002, 106, 7619-7622, which is incorporated by reference in its entirety). The waiting time was 15 min between the start of each addition, and the precursor doses were added by syringe pump over a 3 minute injection time. Following shell growth, the solution was quantitatively recovered. The progress and yield of the overcoating reaction were monitored via UV-VIS absorption, PL, and transmission electron microscopy (TEM), and wavelength dispersive spectroscopy (WDS) compositional analysis.

Samples showed striking increases in brightness under room light upon overcoating with CdS. The PL QY was measured using an integrating sphere under 514 nm excitation, and found to be 98% for the sample described in Example 2. Characteristic values fell between 90% and 98%.

Core-shell nanocrystal heterostructures have been explored widely as a means to adjust the photophysical properties of nanocrystals, (see, e.g., Hines, M.; Guyot-Sionnest, P. *Journal of Physical Chemistry* 1996, 100, 468-471; and Ivanov, S.; Piryatinski, A.; Nanda, J.; Tretiak, S.; Zavadil, K.; Wallace, W.; Werder, D.; Klimov, V. Type-II Core/Shell CdS/ZnSe Nanocrystals: Synthesis, Electronic Structures, and Spectroscopic Properties. *J. Am. Chem. Soc.* 2007, each of which is incorporated by reference in its entirety) and can be used to increase their brightness as fluorophores in two ways: (1) maximizing the PL QY through electronic and chemical isolation of the core from surface-associated recombination centers; and (2) increasing the excitation rate (absorption cross-section) by building a high density of electronic states at energies above the shell bandgap. These two roles for the shell present a potential trade-off in terms of shell material. A wide bandgap shell imposes large electronic barriers for carrier access to the surface but will be less able to contribute to absorption, while a narrower gap shell could participate in light harvesting but may make it harder to achieve high QY.

For the case of CdSe, one of the best studied nanocrystal nanocrystal core materials, the sulfides of zinc and cadmium (ZnS and CdS) are isostructural materials that have been applied to form shells, both as pure materials and in heterostructures with alloyed and/or graded compositions of $Cd_xZn_{1-x}S$. See, for example, Xie, R.; et al. *J. Am. Chem. Soc.* 2005, 127, 7480-7488; Hines, M.; Guyot-Sionnest, P. *Journal of Physical Chemistry* 1996, 100, 468-471; Kuno, M.; et al. *Journal of Chemical Physics* 1997, 106, 9869-9882; Snee, P.; et al. *Advanced Materials* 2005, 17, 1131; and Peng, X.; et al. *Journal of the American Chemical Society* 1997, 119, 7019-7029; each of which is incorporated by reference in its entirety. The use of Cd-rich or pure CdS shells imposes challenges in maintaining high QY (literature QY values are characteristically 20-65% for CdS shells of comparable thickness; see, e.g., Li, J.; et al. *J. Am. Chem. Soc.* 2003, 125, 12567-12575; Xie, R.; et al. *J. Am. Chem. Soc.* 2005, 127, 7480-7488; van Embden, J.; Jasieniak, J.; Mulvaney, P. Mapping the Optical Properties of CdSe/CdS Heterostructure Nanocrystals: The Effects of Core Size and Shell Thickness. *Journal of the American Chemical Society* 2009; and Peng, X.; et al. *Journal of the American Chemical Society* 1997, 119, 7019-7029; each of which is incorporated by reference in its entirety) in terms of the strong redshift of the nanocrystal excited states encountered upon overcoating with a weakly-confining shell. The redshift imposes a strong requirement of structural homogeneity in shell growth if inhomogeneous broadening of the PL emission spectrum is to be avoided.

Conformal shells on nanocrystals are generally produced by introducing shell precursors in a manner such that material adds to the surface of existing nanocrystals but nucleation of new particles is rejected. In order to help suppress nucleation and anisotropic elaboration of the nanocrystals, selective ionic layer adhesion and reaction (SILAR) growth techniques have been applied. In the SILAR approach, metal and chalcogenide precursors are added separately, in an alternating fashion. The goals of such an approach are to: (1) saturate available surface binding sites in each half-cycle in order to enforce isotropic shell growth; and (2) avoid the simultaneous presence of both precursors in solution so as to minimize the rate of homogenous nucleation of new nanoparticles of the shell material.

Among the features in the synthetic methods described here are: 1) the application of $TMS_2S$ as a sulfur precursor in alternate-layer-addition shell growth; 2) the use of sub-monolayer reagent doses in each half-cycle; 3) the use of a constant, and lower, shell growth temperature than is characteristic; and 4) the use of a low-temperature "hold" step to aid in isolation of CdSe cores prior to CdS shell growth.

Salient features that make this an attractive synthetic procedure for scientific and commercial purposes include: 1) the achievement of high photoluminescence QY from CdSe nanocrystals with a shell of constant composition (CdS) and a high excitation rate at blue excitation wavelengths; 2) the avoidance of pyrophoric shell precursor materials (e.g. dimethylcadmium, which has been widely used); 3) the use of liquid-phase shell growth solvents, which aids recovery and further processing of overcoated nanocrystals; and 4) the quantitative conversion of shell growth reagents, which aids in programming of desired photoluminescence characteristics in the resulting particles and limits waste.

Example 4 below describes ligand exchange of our CdSe/CdS nanocrystals using a polymeric imidazole ligand (PIL) system developed recently (Liu, W.; et al. *Journal of the American Chemical Society* 2010, 132, 472-483, which is incorporated by reference in its entirety). The resulting change in PL QY upon displacement of the native nanocrystal surface coating by the PIL and subsequent dissolution in water is shown. Importantly, the PIL system yields CdS-coated nanocrystals that retain QY of >60% in aqueous solution. This is comparable to or greater than the PL QY found for similar preparations using nanocrystals with ZnS- or CdZnS alloy-terminated shells. The hydrodynamic diameter (HD) of the resulting aqueous CdSe/CdS core/shell nanocrystals was ca. 11.5 nm. The nanocrystals described above are thus applicable as bright (high excitation rate, high PL QY) inorganic fluorophores in aqueous environments.

The alternate layer addition strategy described may be extended to core/shell material systems other than CdSe/CdS in cases where such is desirable. For example, while the PIL ligand exchange system works well with the pure CdS shell, ligand exchange with thiol-based hydrophilic coatings (Liu, W.; et al. *J. Am. Chem. Soc.* 2008, 130, 1274-1284, which is incorporated by reference in its entirety) can cause a significant decrease in QY. A thin ZnS shell can be applied to the surface of the CdSe/CdS QDs (creating a CdSe/CdS/ZnS core/shell/shell heterostructure) by substituting Zn oleate for Cd oleate in the synthetic procedure. This system experiences a significantly smaller decrease in QY on ligand exchange with thiols than does the CdSe/CdS system.

Example 1: CdSe Core Synthesis

Cadmium selenide nanocrystal cores were synthesized in a solvent of equal parts trioctylphosphine (TOP) and trioctylphosphine oxide (TOPO). The Cd precursor was generated in situ by heating CdO with tetradecylphosphonic acid (TDPA) at 330° C. under flowing nitrogen until the solution became colorless. Following removal of evolved $H_2O$ under vacuum at reduced temperature, the solution was heated to 360° C. under nitrogen. A solution of trioctylphosphine selenide (TOPSe) in TOP was rapidly introduced, and the system was allowed to react at ~300° C. for a short time before cooling to room temperature and storage as a yellow waxy solid. The batch used in the following example was prepared using a Se:TDPA:Cd ratio of 2.25:2:1 and exhibited a lowest-energy exciton absorption feature at 487 nm, and showed a well-resolved band-edge photoluminescence peak, but low PL QY, when dispersed in hexanes.

Example 2: CdSe/CdS Core/Shell Synthesis

A portion of the crude CdSe core batch was warmed gently, diluted with hexanes, and centrifuged to remove any undissolved material. The nanocrystals were then flocculated by addition of acetone and/or methanol. After decanting the supernatant liquid, the nanocrystals were brought into hexanes and held as such at 4° C. for a period of 4-24 hours. Then, the sample was again centrifuged and any precipitated material discarded prior to addition of a polar solvent to flocculate the nanocrystals a second time. After this, the nanocrystals were brought into a measured volume of hexane and their UV-VIS absorption spectrum was recorded at measured dilution to gauge the size and quantity of nanocrystals.

The nanocrystals were introduced to a solvent of 2:1 octadecene:oleylamine and degassed at 100° C. to remove hexanes. The system was placed under nitrogen and heated to 180° C. before commencing reagent addition via syringe pump. Solution A (Cd precursor): to a solution of 0.2 M Cd oleate in octadecene was added 2 equivalents of decylamine, followed by a volume of TOP to yield a Cd concentration of 0.1 M. Solution B (S precursor) was a 0.1 M solution of $TMS_2S$ in TOP. Alternating injections of Solutions A and B were performed, starting every 15 minutes. The injection flow rate was adjusted so that the desired dose for each cycle was added over the course of 3 minutes. At the conclusion of the reaction, the temperature was reduced to ambient, and the sample (a strongly colored and strongly fluorescent oil) was retrieved quantitatively and its total volume recorded to aid in calculation of the molar extinction coefficient.

FIGS. 1A-1C illustrate the shift in electronic spectra of CdSe nanocrystals upon CdS shell deposition by the described alternate layer addition approach. FIG. 1A: shift in absorption spectra for synthesis described in Example 2. Absorption spectra of CdSe nanocrystals (dark blue), and the same after 1 (green), 2 (red), 3 (light blue), 4 (purple), and 5 (yellow) complete addition cycles of CdS precursors. Spectra are normalized such that value at longest-wavelength absorption peak is 1. Inset: Absorption spectra of CdSe nanocrystals and 5-cycle-coated products presented in molar extinction units (liters/mole-cm). FIG. 1B, shift in PL emission spectrum for synthesis described in Example 2, under 365 nm excitation, with spectra normalized such that the peak value is 1, and with traces colored to match those in FIG. 1A. FIG. 1C, absorption and emission spectrum peak energies versus predicted CdS shell thickness for the sample in Example 2 (marked 1A), for a sample prepared similarly with only 4 cycles of CdS addition (marked 1B), and for a sample prepared using larger (and lower-energy) CdSe nanocrystal starting material (marked 2).

Figure 2:
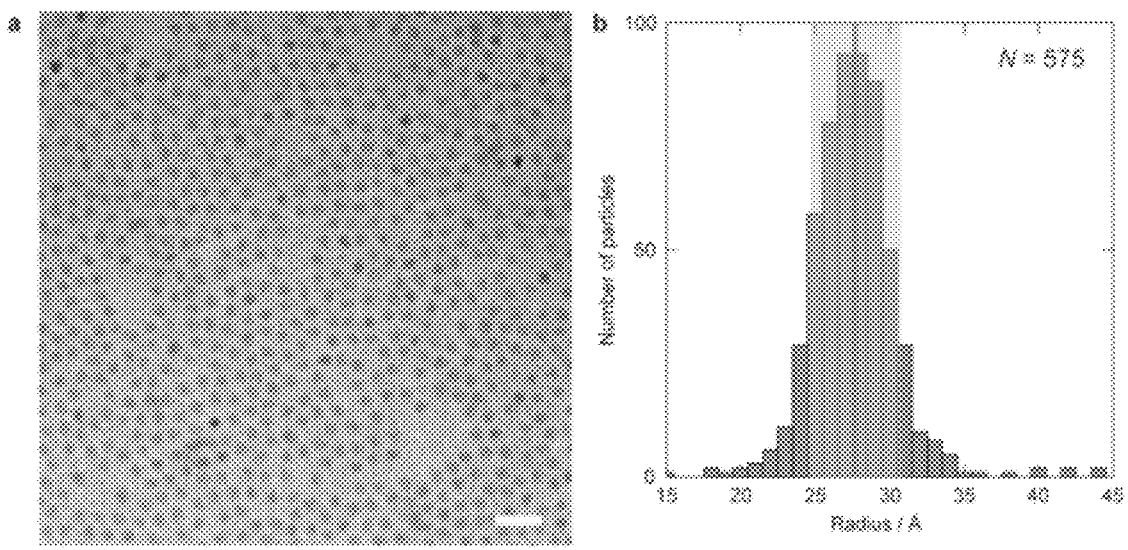
FIG. 2A is a TEM image of semiconductor nanocrystals.
FIG. 2B is a histogram of semiconductor nanocrystal sizes.

FIG. 2A shows a representative bright-field TEM image of nanoparticles (of Example 2) supported on carbon film. Scalebar, 20 nm. FIG. 2B, particle size analysis of the image in FIG. 2A, performed using NIH Image-J software, and revealing a mean radius of 2.76 nm. The shaded box represents the standard deviation of measured particle radii.

Figure 3:
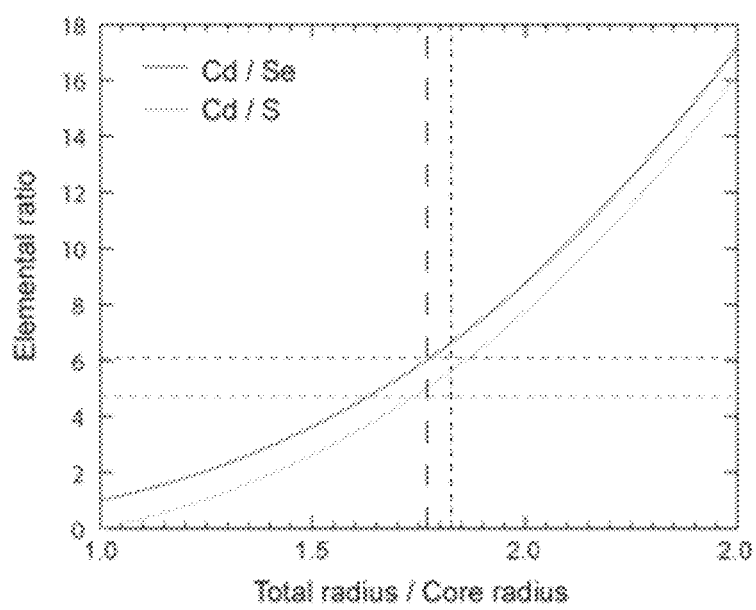
FIG. 3 is a graph depicting WDS results for semiconductor nanocrystals.

FIG. 3 shows results of wavelength dispersive spectroscopy (WDS) analysis of the Cd, Se, and S elemental composition of CdSe/CdS core/shell nanocrystals. Dashed horizontal lines indicate measured ratios of Cd to Se (red) and Cd to S (green) for sample 1B described in FIG. 1C. Curves represent predicted elemental ratios for Cd to Se (red) and Cd to S (green) for concentric sphere and shell with bulk CdS and CdSe atomic densities as a function of the ratio of total radius (core+shell) to core radius alone. Crossing points with measured data provide an estimate of the shell thickness; the average of the Cd/Se and Cd/S curves is displayed as a broken vertical line. It shows relatively close agreement with the targeted shell thickness (dashed vertical line) that was used as the basis for CdS precursor doses.

Example 3: Absolute Quantum Yield Measurement

Absolute quantum yields were measured using an integrating sphere. Laser excitation (514 nm) was chopped (80 Hz) and directed to an integrating sphere in which an NMR tube containing the sample (1 mL) was placed. Reference signals (i.e. solutions without emitting species) were also collected. Output light from the sphere was passed through a 540 nm cutoff filter and collected on a photodetector (Newport 818 UV calibrated photodetector) generating a current intensity on a lock amplifier. The quantum yield value was obtained by dividing a difference of sample and reference signals (with cutoff filter) with a difference of reference and sample signals without a cutoff filter. This method was verified by measuring quantum yields of standard laser dyes Rhodamine 101 and Rhodamine B in clear and scattering solutions (by addition of 100 nm diameter silica particles). The obtained values for laser dyes were: Rhodamine 101: 0.99 (ref: 1.00), Rhodamine B: 0.33 (ref: 0.31). See, e.g., Magde, D.; et al. *Photochemistry and Photobiology* 1999, 70, 737-744, which is incorporated by reference in its entirety.

Example 4: CdSe/CdS Ligand Exchange Chemistry

CdSe/CdS core/shell nanocrystals (2 nmol) were flocculated from the stock solution using acetone and brought into 50 μL of chloroform ($CHCl_3$). The nanocrystal stock solution was mixed with a solution of PIL ligand (5 mg in 30 μL $CHCl_3$) that bore equimolar imidazole and methoxy-terminated oligo(ethylene glycol) sidechains. See, e.g., U.S. Patent Application No. 61/316,659, filed Mar. 23, 2010, which is incorporated by reference in its entirety. The mixture was stirred for 10 min at room temperature, after which 30 μL of methanol was added followed by stirring for an additional 20 min. At this time, the addition of EtOH (30 μL), $CHCl_3$ (30 μL), and excess hexanes brought about the flocculation of the nanocrystals. The sample was centrifuged. The clear supernatant was discarded, and the pellet dried in vacuo. The sample was then brought into aqueous solution by the addition of phosphate buffered saline (500 μL, pH 7.4).

Figure 4:
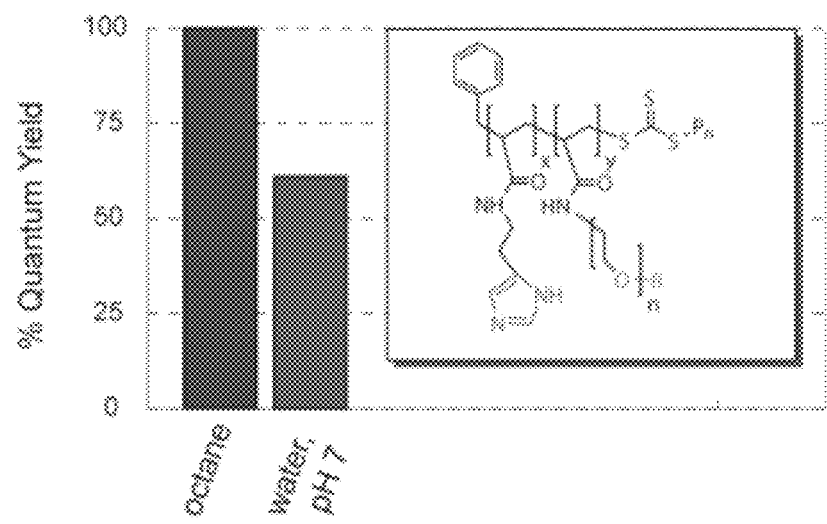
FIG. 4 is a graph depicting photoluminescent quantum yields of semiconductor nanocrystals under varying conditions.

FIG. 4 shows the change in PL QY of CdSe/CdS nanocrystals (sample 1B from FIG. 1C) upon surface ligand exchange as described in Example 4. Nanocrystals brought into neutral aqueous solution displayed 60% QY relative to the same dispersed in octane. The nanocrystals in octane were separately measured to have an absolute QY>90%. The inset depicts the generalized structure of the polymeric imidazole ligand used: in the above, $R=CH_3$, $n=11$, and $x=y=50\%$. $P_n$ represents a second polymer chain nucleated by the same trithiocarbonate reversible addition-fragmentation transfer (RAFT) polymerization reaction center. See, e.g., U.S. Patent Application No. 61/316,659, filed Mar. 23, 2010, which is incorporated by reference in its entirety.

What is claimed is:

1. A method of making a semiconductor nanocrystal comprising:

forming a nanocrystal core including a first semiconductor material; and holding the nanocrystal core below a contact temperature before sequentially contacting the nanocrystal core with an M-containing compound and an X donor at the contact temperature where material adds to the surface of existing nanocrystals but at which nucleation of new particles is rejected, thereby forming a second semiconductor material on a surface of the nanocrystal core; and repeating the step of sequentially contacting the nanocrystal core with an M-containing compound and an X donor;

wherein both the M-containing compound and the X donor is substoichiometric with respect to forming a monolayer on the nanocrystal core, and wherein the sequential contacting includes a waiting period between contacting the nanocrystal core with the M-containing compound and contacting the nanocrystal core with the X donor, wherein X donor is a silyl group, and wherein the semiconductor nanocrystal exhibits photoluminescence with a quantum yield of at least 90% and a full width at half max (FWHM) of less than 30 nm.

2. The method of claim 1, wherein the M-containing compound is selected to react quantitatively.

3. The method of claim 1, wherein the X donor is selected to react quantitatively.

4. The method of claim 1, wherein the first semiconductor material is ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, PbTe, or a mixture thereof.

5. The method of claim 1, wherein the second semiconductor material is ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, PbTe, or a mixture thereof.

6. The method of claim 1, wherein the first semiconductor material is CdSe.

7. The method of claim 6, wherein the second semiconductor material is CdS.

8. The method of claim 1, wherein the X donor is bis(trimethylsilyl)sulfide.

9. The method of claim 1, wherein the semiconductor nanocrystal exhibits photoluminescence with a quantum yield of at least 95%.

10. The method of claim 1, wherein the semiconductor nanocrystal exhibits photoluminescence with a quantum yield of at least 98%.

11. The method of claim 1, wherein the waiting period is less than 15 minutes.

12. The method of claim 1, wherein forming the nanocrystal core takes place at a temperature higher than the sequential contacting takes place.

13. The method of claim 1, wherein the sequential contacting takes place at a temperature of 180° C.

* * * * *